(12) United States Patent
Clinton et al.

(10) Patent No.: US 8,784,541 B2
(45) Date of Patent: Jul. 22, 2014

(54) CORDIERITE-BASED COMPOSITE MEMBRANE COATED ON CORDIERITE MONOLITH

(75) Inventors: Joel Edward Clinton, Waverly, NY (US); Yunfeng Gu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 288 days.

(21) Appl. No.: 13/293,745

(22) Filed: Nov. 10, 2011

(65) Prior Publication Data

US 2013/0118355 A1 May 16, 2013

(51) Int. Cl.
| B01D 71/02 | (2006.01) |
| B01D 53/22 | (2006.01) |
| B01D 67/00 | (2006.01) |
| B01D 69/12 | (2006.01) |
| B05D 3/02 | (2006.01) |

(52) U.S. Cl.
USPC .............. 96/11; 55/487; 55/523; 427/201; 427/245; 427/372.2; 428/116

(58) Field of Classification Search
USPC ......... 96/4, 11; 95/45; 55/487, 523; 427/201, 427/244, 245, 372.2; 428/116
See application file for complete search history.

(56) References Cited

U.S. PATENT DOCUMENTS

| 4,404,007 A * | 9/1983 | Tukao et al. ............. 55/523 |
| 4,983,423 A | 1/1991 | Goldsmith |
| 5,106,502 A | 4/1992 | Goldsmith |
| 5,120,576 A * | 6/1992 | Goldsmith et al. ......... 427/245 |
| 5,733,103 A | 3/1998 | Wallace et al. |
| 5,773,103 A * | 6/1998 | Ciora et al. ............. 428/34.6 |
| 6,815,038 B2 * | 11/2004 | Morimoto et al. ......... 428/116 |
| 6,903,051 B2 | 6/2005 | Tao et al. |
| 7,553,349 B2 | 6/2009 | Gadkaree et al. |
| 7,674,498 B2 | 3/2010 | Tao et al. |
| 7,700,163 B2 | 4/2010 | Ingram-Ogunwumi et al. |
| 7,767,257 B2 | 8/2010 | Gu et al. |
| 8,006,637 B2 | 8/2011 | Liu et al. |
| 8,334,062 B1 * | 12/2012 | Pujari et al. ............. 428/702 |
| 8,394,167 B2 * | 3/2013 | Merkel et al. ............. 55/523 |
| 8,470,430 B2 * | 6/2013 | Hiramatsu ............. 428/116 |
| 2006/0168927 A1 * | 8/2006 | Watanable et al. ......... 55/523 |
| 2008/0035557 A1 | 2/2008 | Partridge et al. |
| 2009/0000475 A1 | 1/2009 | Fekety et al. ............. 95/105 |
| 2010/0126133 A1 * | 5/2010 | Fekety et al. ............. 55/523 |
| 2011/0300335 A1 * | 12/2011 | Clinton et al. ............. 428/141 |

FOREIGN PATENT DOCUMENTS

| EP | 1340541 | 2/2002 |
| WO | 92/11925 | 7/1992 |
| WO | 2010/097638 | 9/2010 |
| WO | 2011/038059 | 3/2011 |

* cited by examiner

*Primary Examiner* — Jason M Greene
(74) *Attorney, Agent, or Firm* — Susan S. Wilks

(57) ABSTRACT

Composite-membrane monoliths include a cordierite monolith having a cordierite-ceramic composite membrane bonded to surfaces thereof with a surface median pore size. The cordierite-ceramic composite membrane has membrane surfaces with a membrane median pore size of 0.3 μm or less. The cordierite-ceramic composite membrane may be a composite formed by firing the cordierite monolith subsequent to applying a cordierite-ceramic composite slip to surfaces thereof. The cordierite-ceramic slip may include cordierite particles and ceramic particles. The cordierite particles may have a cordierite median particle size smaller than the surface median pore size. The ceramic particles may have a ceramic median particle size smaller than the cordierite median particle size.

16 Claims, 5 Drawing Sheets

CORDIERITE-BASED COMPOSITE MEMBRANE COATED ON CORDIERITE MONOLITH

BACKGROUND

1. Field

The present specification generally relates to membrane-coated monoliths and methods for making membrane-coated monoliths and, more particularly, to cordierite membranes coated with cordierite-based composite membranes and methods for making the same.

2. Technical Background

Porous ceramic membranes are used in industrial liquid filtration separations, and have recently been investigated for gas separation and catalytic reaction. Most recently, they have been explored for gas-particulate separation in diesel particulate filter (DPF) and gasoline particulate filter (GPF) applications, and vapor-vapor separation in on-board separation of gasoline (OBS) applications. For different applications, the ceramic membrane materials and their microstructure properties must be designed differently to meet different application requirements. For example, gas-separation ceramic membranes have no pores or pore size less than 0.001 µm to separate gas molecules effectively, while DPF or GPF membranes typically require pore sizes of a few micrometers or larger to meet both low backpressure and high filtration efficiency requirements.

In some applications involving monolith substrates, it is desirable to coat a ceramic membrane on the monolith with a material such as a polymer, which may seal the pores of the monolith substrate to enable a substantially leak-free vacuum to be applied to the monolith substrate. For polymer coating processes generally, the ease of the coating process increases when the pore size of ceramic membrane being coated is minimized. To accomplish smaller pore sizes of ceramic membranes on monolithic substrates, smaller ceramic particles are required for forming the ceramic membranes. However, in some instances it can be extremely labor-intensive or even impossible to produce suitably small particles of certain materials. For example, forming a cordierite membrane with pore sizes of less than 0.3 µm is nearly impossible, owing at least in part to the general inability of conventional milling techniques to reduce cordierite particles sizes to less than 1 µm.

Though other materials such as alumina can be milled to have particle sizes less than 1 µm, pure-alumina membranes on monoliths such as cordierite are easily subject to cracking, owing to differences in the coefficients of thermal expansion between alumina and cordierite. Furthermore, coating of very small alumina particles directly onto a large pore-size monolith substrate is extremely difficult without the application of an intermediate layer.

Accordingly, ongoing needs exist for coatable ceramic-membrane materials and methods for forming ceramic membranes on monolith substrates.

SUMMARY

According to various embodiments, composite-membrane monoliths are provided. The composite-membrane monoliths may include a cordierite monolith having surfaces with a surface median pore size of from about 1 µm to about 15 µm. The composite-membrane monoliths also may include a cordierite-ceramic composite membrane bonded to the surfaces. The cordierite-ceramic composite membrane may define membrane surfaces of the cordierite-ceramic composite membrane. The cordierite-ceramic composite membrane may be a composite formed from a mixture including, for example, cordierite particles and ceramic particles. The cordierite particles may have a cordierite median particle size smaller than the surface median pore size of the ceramic monolith. The ceramic particles may have a ceramic median particle size smaller than the cordierite median particle size. The combination of the respective median particle sizes of the cordierite particles and the ceramic particles may result in membrane surfaces having a membrane median pore size of 0.3 µm or less.

According to further embodiments, methods for forming composite-membrane monoliths are provided. The methods may comprise applying a cordierite-ceramic composite slip to surfaces of a cordierite monolith to form a coated cordierite monolith. Generally, the surfaces of the channels may have a surface median pore size of from about 1 µm to about 15 µm. The cordierite-ceramic composite slip may include a mixture of cordierite particles and ceramic particles. The cordierite particles may have a cordierite median particle size smaller than the surface median pore size, and the ceramic particles may have a ceramic median particle size smaller than the cordierite median particle size. The methods may further include firing the coated cordierite monolith to form the composite-membrane monolith. During the firing, the ceramic composite slip forms a cordierite-ceramic composite membrane bonded to the surfaces of the cordierite monolith and having a membrane surface. The combination of the respective median particle sizes of the cordierite particles and the ceramic particles may result in membrane surfaces having a membrane median pore size of 0.3 µm or less.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
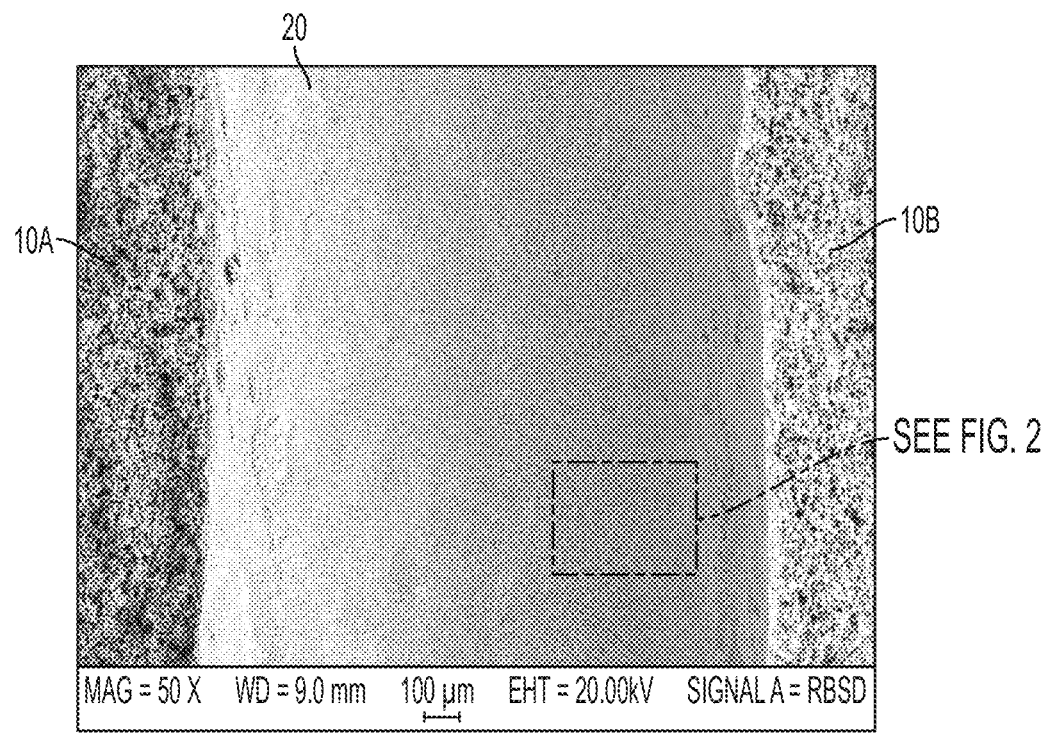
FIG. 1 is an SEM micrograph of a cordierite-ceramic composite membrane coated on a honeycomb monolith.

Reference will now be made in detail to embodiments of composite-membrane monoliths. The composite-membrane monoliths may include a cordierite monolith having channels defined therethrough. In general, the surfaces of the channels may have a surface median pore size of from about 1 µm to about 15 µm. The composite-membrane monoliths also may include a cordierite-ceramic composite membrane bonded to the surfaces of the channels. The cordierite-ceramic composite membrane may define membrane surfaces of the cordierite-ceramic composite membrane inside the channels. The cordierite-ceramic composite membrane may be a composite formed from a mixture including, for example, cordierite particles and ceramic particles other than cordierite particles. The cordierite particles may have a cordierite median particle size smaller than the surface median pore size. The ceramic particles may have a ceramic median particle size smaller than the cordierite median particle size. The combination of the respective median particle sizes of the cordierite particles and the ceramic particles produce membrane surfaces with a membrane median pore size of 0.3 µm or less. Embodiments of methods for forming the composite-membrane monoliths will be also be described in further detail below.

The composite-membrane monoliths may comprise a cordierite monolith and a cordierite-ceramic composite membrane bonded to surfaces of the cordierite monolith so as to define membrane surfaces of the cordierite-ceramic composite membrane opposite an interface of the cordierite-ceramic composite membrane with the cordierite monolith. In some embodiments, the cordierite-ceramic composite membrane is bonded to surfaces of channels defined through the cordierite monolith, so as to define membrane surfaces of the cordierite-ceramic composite membrane inside the channels. The channels, when present, may have various cross-sectional shapes, such as circles, ovals, triangles, squares, pentagons, hexagons, or tessellated combinations or any of these, for example, and may be arranged in any suitable geometric configuration. The channels, when present, may be discrete or intersecting and may extend through the cordierite monolith from a first end thereof to a second end thereof, opposite the first end.

The cordierite monolith may be any shaped cordierite substrate suitable for the application of a membrane on a surface thereof. The shaped ceramic may be formed, extruded, or molded, for example, and may be of any shape or size. Illustrative embodiments of shapes include, without limitation, cylinders, triangular solids, rectangular solids, hexagonal solids, and even substantially planar shapes such as sheets. In some embodiments, the cordierite monolith may be a filter formed from cordierite. In further embodiments, the cordierite monolith may be a honeycomb filter. The composite-membrane monoliths may include a cordierite monolith having at least one layer of an inorganic membrane applied to a surface of the cordierite monolith. In some embodiments, there may be more than one layer of inorganic membrane applied to the same surface of the cordierite monolith.

The cordierite monolith is typically formed from cordierite, a magnesium aluminum silicate. In general, cordierite is a solid solution having a composition according to the formula $(Mg,Fe)_2Al_3(Si_5AlO_{18})$. The exact composition of the cordierite material used to form the cordierite monolith according to embodiments herein may be varied. For example, the pore size of the cordierite material may be controlled, the porosity of the cordierite may be controlled, and the pore size distribution of the cordierite material may be controlled, by varying the particle sizes of the magnesium, aluminum and silica raw materials. In addition, pore formers may be included in cordierite batches used to form the cordierite monolith.

In some embodiments, the surfaces (such as the surfaces of the partition walls defining the channels through the monolith) of the cordierite monoliths may have surface median pore sizes, for example, of from 1.0 µm to 15 µm. For example, in some of these embodiments, the cordierite monolith may have surface median pore sizes from 1.5 µm to 15 µm or even from 1.5 µm to 12 µm. In some other embodiments, the cordierite monolith may have surface median pore sizes from 1.5 µm to 5 µm or even from 1.5 µm to 4.5 µm. As used herein, the term "pore size" refers to a cross sectional diameter or, when pore have non-circular cross-sections, to the diameter of a hypothetical circle having the same cross sectional area as that of the non-circular pore. Generally, pore sizes of any given material exist in a statistical distribution. Thus, the term "median pore size" or "$d_{50}$" refers to a length measurement, above which the pore sizes of 50% of the pores lie and below which the pore sizes of the remaining 50% of the pores lie, based on the statistical distribution of all the pores.

In some embodiments, the cordierite monoliths may have porosities, prior to coating with the cordierite-ceramic composite membrane, from 35% to 60 or even from 35% to 55% as measured by mercury intrusion porosimetry. In some of these embodiments, the porosity of the cordierite monolith may be less than 60%, less than 55%, less than 50%, less than 48%, or less than 46%, for example. Moreover, it should be understood that the embodiments of the cordierite-ceramic membrane described herein may be utilized on cordierite monoliths having other porosities including, without limitation, cordierite monoliths with porosities less than 35% or greater than 60%.

Figure 2:
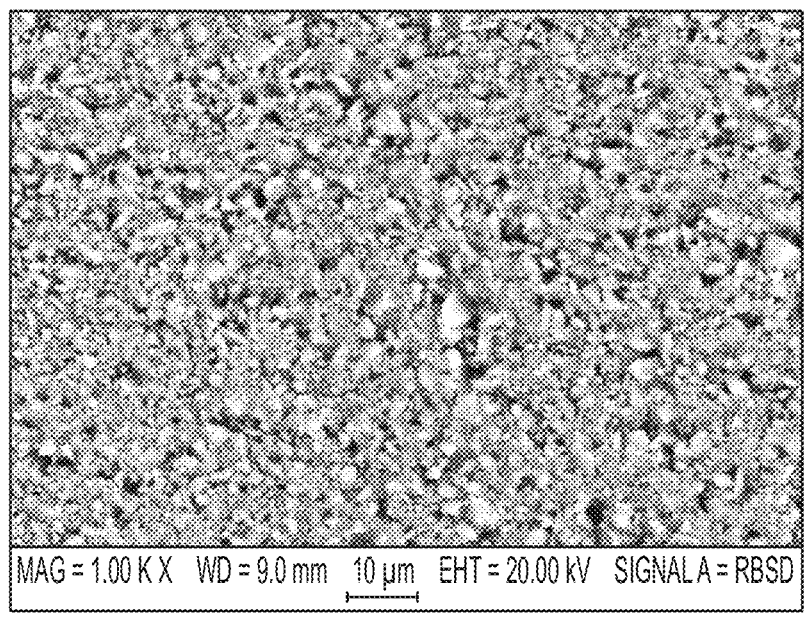
FIG. 2 is a magnified view of the membrane surface of the cordierite-ceramic composite membrane of FIG. 1.

To facilitate application of a functional polymeric coating or membrane to the channels of the cordierite monolith, a cordierite-ceramic composite membrane is bonded to the surfaces of the cordierite monolith, as is depicted in the SEM micrographs contained in FIGS. 1 and 2. In particular, FIG. 1 shows a cross-sectional cut of a cordierite monolith, in which a membrane surface 20 is visible. The membrane surface 20 is a cordierite-ceramic membrane. Also visible are adjacent channel walls 10A and 10B. The cordierite-ceramic membrane provides an interface layer between the surfaces of the cordierite monolith and the functional coating or membrane such that the functional coating or membrane is present on the surfaces of the cordierite monolith rather than in the pores of cordierite monolith. In some embodiments, the cordierite-ceramic composite membrane may be bonded directly to surfaces of the cordierite monolith, for example, as a result of firing a ceramic slip that has been coated onto the surfaces of the cordierite monolith. In such embodiments, the cordierite-ceramic composite membrane would be bonded directly to the surfaces of the cordierite monolith without any intervening layer such as an intermediate layer or a buffer layer to attain compatibility (such as matching of coefficient of thermal expansion, for example) between the materials of the cordierite-ceramic composite membrane and the cordierite monolith.

As will be described in further detail herein, the cordierite-ceramic composite membrane may be a composite formed from a mixture such as a slip or a slurry. The mixture may include, for example, cordierite particles having a cordierite median particle size and ceramic particles having a ceramic median particle size. The particle sizes of the cordierite particles and the ceramic particles are selected such that the resultant cordierite-ceramic membrane has membrane surfaces with membrane median pore sizes which are less than the surface median pore sizes of the cordierite monolith. The decrease in the median pore size from the surfaces of the cordierite monolith to the membrane surfaces facilitates the subsequent coating of a functional coating or membrane onto the membrane surfaces without the functional coating significantly intruding into the pores of either the cordierite-ceramic membrane and/or the pores of the cordierite monolith. Specifically, median particle sizes of the cordierite particles and the ceramic particles are selected such that the resultant cordierite-ceramic membrane has a membrane median pore size of 0.3 µm or less. For example, in some embodiments, the membrane median pore size of the cordierite-ceramic membrane may be from about 0.05 µm to 0.3 µm. In some of these embodiments, the membrane median pore size may be less than 0.25 µm or even less than 0.20 µm. In some other embodiments, the membrane median pore size may be less than 0.15 µm or even less than 0.1 µm.

For example, in some embodiments, the cordierite-ceramic membrane may be formed from a slip of cordierite and ceramic particles which is applied to the surfaces of the ceramic monolith and subsequently fired to produce the cordierite-ceramic membrane. To achieve a cordierite-ceramic membrane with the desired membrane median pore size, the cordierite particles in the slip may have cordierite median particle sizes of from 0.8 µm to 5 µm or even from 1 µm to 2.5 µm. For example, in some of these embodiments, the cordierite median particle size may be from 1 µm to 2 µm or even from 1 µm to 1.5 µm. The ceramic particles may have a ceramic median particle size from 0.05 µm to 0.5 µm or even from 0.05 µm to 0.45 µm. In some of these embodiments, the ceramic median particle size may be from 0.05 µm to 0.4 µm or even from 0.05 µm to 0.35 µm. In some other embodiments, the ceramic particles may have a ceramic median particle size of less than 0.5 µm, less than 0.4 µm, less than 0.3 µm, less than 0.2 µm, or less than 0.1 µm. In general, the cordierite particles in the mixture used to form the cordierite-ceramic composite membrane may have a cordierite median particle size which is smaller than the surface median pore size of the cordierite monolith. In some embodiments, the ceramic particles in the mixture used to form the cordierite-ceramic composite membrane may have may have a ceramic median particle size smaller than the cordierite median particle size.

In order to attain the desired coatability of a functional coating or membrane on the cordierite-ceramic composite membrane monolith the median pore size of the cordierite-ceramic composite membrane should be less than or about equal to the aggregate polymer size of the functional coating or membrane. In addition, it is desirable that the cordierite-ceramic membrane be free from cracks or discontinuities in the surface of the cordierite-ceramic composite membrane on the cordierite monolith. Such discontinuities may create discontinuities in the polymer membrane which, in turn, cause leaks which would interfere with the vacuum integrity of the polymer membrane surface. Therefore, to provide a polymer-coatable cordierite-ceramic composite membrane that is able to maintain a vacuum, the characteristics of the composite-ceramic membrane applied to surfaces of the cordierite monolith must be compatible with the application of a polymer layer which can withstand vacuum. That is, for polymer-coating applications, the membrane surfaces of the composite-ceramic membrane monolith must have a desirable pore size, and a desirable pore size distribution, and the membrane monolith must not have significant cracks or discontinuities that would allow leaks in a polymer layer applied to the composite-membrane monolith.

In the embodiments described herein, the ceramic particles may comprise or consist of any suitable ceramic material, other than cordierite, that is available with the desired particle size or that may be size-reduced, such as by milling or any other known technique, to a suitable ceramic median particle size, such as those described above.

Characteristics of the cordierite-ceramic composite membrane may depend on the characteristics of the cordierite monolith and the characteristics of the cordierite-ceramic composite membrane. These characteristics include compatibility between the underlying monolith substrate and the applied inorganic membrane, pore size, surface roughness of the underlying monolith substrate, and the porosity and surface roughness the inorganic membrane. These characteristics may be affected by the techniques used to form and deposit the inorganic membrane on the monolith substrate.

In embodiments described herein, the membrane-coated surfaces of the membrane monolith are substantially or totally free of cracks. One technique to reduce cracking in the ceramic membrane layer applied to a monolith substrate is to match the physical properties of the membrane and the monolith substrate. For example, like materials will have like physical characteristics, including thermal expansion characteristics. Thus, it may be desirable that the ceramic material be chosen such that, when the cordierite-ceramic composite membrane is formed on the cordierite monolith, the cordierite-ceramic composite membrane will have the same or similar coefficient of thermal expansion (CTE) characteristics as those of the cordierite monolith. It may also be desirable to choose the ceramic material such that the firing temperature required to form the cordierite-ceramic composite membrane is as low as possible, so as to minimize production costs. In general, the firing temperature required to form the cordierite-ceramic composite membrane should be below the temperature at which the cordierite material from which the cordierite monolith is formed becomes unstable, such as, for example below 1300° C. In some embodiments, particularly suitable ceramic materials for use in the cordierite-ceramic composite membrane include, but are not limited to, alumina, ceria, silica, zirconia, zeolite, mullite, titania, yttria, tin oxide, silicon carbide, silicon nitride, and mixtures thereof.

The composition of the cordierite-ceramic composite membrane may be varied to tailor the membrane median pore size to a value suitable for coating the cordierite-ceramic composite membrane with a chosen polymer material. In non-limiting illustrative embodiments, the weight ratio of the cordierite particles used to form the cordierite-ceramic composite membrane to the ceramic particles used to form cordierite-ceramic composite membrane, based on the combined weight of the cordierite particles and the ceramic particles, may be from 9:1 to 3:7 or from 7:3 to 3:7 such as, for example, 9:1, 8:2, 7:3, 4:6, 5:5, 4:6, or 3:7.

The thickness of the cordierite-ceramic composite membrane bonded to the cordierite monolith may be any thickness suited for the intended application of the composite-membrane monolith. In general, for mechanical stability purposes, the minimum and maximum thicknesses of the cordierite-ceramic composite membrane are limited by the particle sizes of the cordierite particles and the ceramic particles used to form the cordierite-ceramic composite membrane. The thickness of the cordierite-ceramic composite membrane may be measured from a single layer of cordierite-ceramic composite membrane or from multiple layers of cordierite-ceramic composite membrane. For example, a cordierite-ceramic composite membranes prepared from particles having a combined median diameter of from 1 µm to 4 µm may have a lower limit of thickness of from about 2 µm to about 5 µm. Generally, cordierite-ceramic composite membranes that are too thick may break down or crack. In illustrative embodiments, the thickness of the cordierite-ceramic composite membrane bonded to the cordierite monolith substrate may be, for example, from 2 µm to 25 µm or even from 2 µm to 20 µm. In some of these embodiments, the thickness of the membrane may be from 2 µm to 18 µm or even from 2 µm to 15 µm. In some other embodiments, the thickness of the membrane may be from 2 µm to 12 µm or even from 2 µm to 10 µm. In one particular embodiment, the thickness of the membrane may be from about 10 µm to about 15 µm.

In the embodiments described herein, the cordierite-ceramic composite membranes generally have a porosity from about 30% to about 65%. In some of these embodiments, the porosity of the cordierite-ceramic composite membranes may be from 40% to 65% or even from 50% to 65%. The porosity of a cordierite-ceramic composite membrane on a particular cordierite monolith may be estimated by preparing an unsupported cordierite-ceramic composite membrane with the same composition on a substrate such as glass or filter paper. In some embodiments, cordierite-ceramic composite membranes with membrane median pore sizes of from 0.5 µm to 0.6 µm, for example, may have a porosity of up to 55%, as measured on a glass or filter-paper substrate. Similarly, cordierite-ceramic composite membranes with membrane median pore sizes of from 0.3 µm to 0.4 µm, for example, may have a porosity of about 58%, as measured on a glass or filter-paper substrate.

Reference will now be made to embodiments of methods for forming the composite-membrane monoliths. In general, the methods may comprise applying a cordierite-ceramic composite slip to surfaces of a cordierite monolith to form a coated cordierite monolith. Thereafter, the coated cordierite monolith is fired to form the cordierite-ceramic composite membrane on the cordierite monolith. During the firing, the ceramic composite slip forms a cordierite-ceramic composite membrane bonded to the surfaces of the cordierite monolith and having a membrane surface with a membrane median pore size of 0.3 µm or less. In some embodiments, the membrane surface is crack-free, as evidenced by a lack of visible cracks in scanning-electron micrographs of the membrane surface. As noted hereinabove, the cordierite-ceramic composite slip may include a mixture of cordierite particles and ceramic particles. The cordierite particles may have a cordierite median particle size smaller than the surface median pore size of the cordierite monolith, and the ceramic particles may have a ceramic median particle size smaller than the cordierite median particle size.

In embodiments of the methods for forming the composite-membrane monoliths, a cordierite-ceramic composite slip may be applied to surfaces of a cordierite monolith to form a coated cordierite monolith. The cordierite monolith may be any cordierite monolith described above with respect to embodiments of composite-membrane monoliths. The cordierite-ceramic composite slip may comprise cordierite particles and ceramic particles intimately mixed into a slurry or suspension. In some embodiments, particularly suitable ceramic materials for use as the ceramic particles include, but are not limited to, alumina, ceria, silica, zirconia, zeolite, mullite, titania, yttria, tin oxide, silicon carbide, silicon nitride, and mixtures thereof. In some embodiments, the cordierite-ceramic composite slip may be applied to the surfaces of the cordierite monolith by casting, dipping, or coating, according to any known technique for applying a ceramic slurry to a ceramic body. For example, the cordierite-ceramic composite slip may be applied using an apparatus such as a flow coater, into which the cordierite-ceramic composite slip may be drawn by a vacuum toward the cordierite monolith. Flow coaters are described in detail, for example, in commonly-assigned U.S. Pat. No. 8,006,637.

The cordierite particles in the cordierite-ceramic composite slip may have a cordierite median particle size, and ceramic particles in the cordierite-ceramic composite slip may have a ceramic median particle size. In non-limiting illustrative embodiments, the cordierite particles may have cordierite median particle sizes of from 0.8 µm to 5 µm or even from 1 µm to 2.5 µm. For example, in some of these embodiments, the cordierite median particle size may be from 1 µm to 2 µm or even from 1 µm to 1.5 µm. The cordierite particles used may be commercially available cordierite powders or, alternatively, cordierite powders formed by firing a batch of cordierite precursor materials into a cordierite ceramic article and mechanically reducing the cordierite ceramic article to a cordierite powder. In non-limiting illustrative embodiments, the ceramic particles may have ceramic median particle sizes from 0.05 µm to 0.5 µm or even from 0.05 µm to 0.45 µm. In some of these embodiments, the ceramic median particle size may be from 0.05 µm to 0.4 µm or even from 0.05 µm to 0.35 µm. In some other embodiments, the ceramic particles may have a ceramic median particle size of less than 0.5 µm, less than 0.4 µm, less than 0.3 µm, less than 0.2 µm, or less than 0.1 µm. As noted hereinabove, the cordierite particles in the cordierite-ceramic composite slip may have a cordierite median particle size smaller than the surface median pore size of the cordierite monolith on which the cordierite-ceramic composite membrane is to be formed. In some embodiments, the ceramic particles in the cordierite-ceramic composite slip may have a ceramic median particle size smaller than the cordierite median particle size.

In non-limiting illustrative embodiments, the weight ratio of the cordierite particles in the cordierite-ceramic composite slip to the ceramic particles in the cordierite-ceramic composite slip, based on the combined weight of the cordierite particles and the ceramic particles, may be from 9:1 (i.e., 90 wt. % cordierite particles and 10 wt. % ceramic particles) to 3:7 (i.e., 30 wt. % cordierite particles and 70 wt. % ceramic particles) or from 7:3 to 3:7 such as, for example, 9:1, 8:2, 7:3, 4:6, 5:5, 4:6, or 3:7. In some embodiments, the cordierite-ceramic composite slip may have a total solids content of from about 5 wt. % to about 30 wt. %, based on the combined weight of the cordierite particles and the ceramic particles present in the cordierite-ceramic composite slip.

The cordierite-ceramic composite slip may be water-based or organic solvent-based and may comprise additional ingredients such as binders, dispersants, antifoaming agents, and combinations thereof. The cordierite particles, the ceramic particles, any aqueous or organic solvent, and any additional ingredients in the cordierite-ceramic composite slip may be mixed by milling or similar mixing techniques. In some embodiments, the mixing procedure also facilitates reducing the size of the particulate components in the mixture. Any mixing or size-reduction process may be conducted for a suitable time to accomplish the desired degree of intimate mixing and/or size reduction of particulate components. The mixing may be performed concurrently with a particle-size reduction involving a grinding medium such as yttria-stabilized zirconia beads, for example, added to the cordierite-ceramic composite slip during its preparation.

The cordierite-ceramic composite slip may include a polymer such as, for example, polyethylene glycol (PEG) or polyvinyl alcohol (PVA). In illustrative embodiments, the cordierite-ceramic composite slip may comprise from 0 wt. % to 10 wt. % of the polymer binder based on the total weight of the cordierite-ceramic composite slip. For example, in some embodiments the polymer binder may be included in the slip in an amount from about from 0 wt. % to 5 wt. % or even from 0.1 wt. % to 5 wt. %. In some other embodiments, the polymer binder may be included in the slip in an amount from 0.5 wt. % to 5 wt or even from 0.5 wt. % to 4 wt. %. In addition, the slip may also contain one or more dispersants. Dispersants, when present, may function to prevent particle agglomeration. In one embodiment, a suitable dispersant is Tiron®, which is 4,5-dihydroxy-1,3-benzenedisulfonic acid disodium salt, available from Fluka, although it should be understood that other dispersants may be used. In illustrative embodiments, the cordierite-ceramic composite slip may comprise less than 0.5 wt. %, less than 0.1 wt. %, or less than 0.05 wt. % dispersant, based on the total weight of the cordierite-ceramic composite slip.

In addition, the slip may also contain an antifoaming agent. Antifoaming agents may be appropriate when an ingredient in the cordierite-ceramic composite slip has foaming or surfactant-like properties. In one embodiment, a suitable antifoaming agent is DC-B antifoam emulsion solution, available from Dow-Corning, although it should be understood that other antifoaming agents may be used. In illustrative embodiments, the cordierite-ceramic composite slip may comprise less than 0.1 wt. %, less than 0.05 wt. %, or less than 0.01 wt. % antifoaming agent, based on the total weight of the cordierite-ceramic composite slip.

Optionally, the cordierite monolith may be washed with a solvent such as deionized water, for example, and/or blown clean with pressurized air to remove any loose particles or debris prior to application of the slip to the monolith. When the cordierite monolith is washed in water, it may be subsequently dried before the cordierite-ceramic composite slip is coated. The drying may be accomplished in an oven set above 100° C. For example, in one embodiment the cordierite monolith is placed in an oven at about 120° C. for 5 hours to 24 hours.

After the slip containing the cordierite and ceramic particles is prepared, the slip is applied to the monolith using one of the aforementioned techniques. Thereafter, the coated cordierite monolith is fired to form the composite-membrane monolith. During the firing the cordierite-ceramic composite slip forms a cordierite-ceramic composite membrane bonded to the surfaces of the cordierite monolith. Due to the selection of appropriately sized cordierite and ceramic powders, the membrane surfaces of the cordierite-ceramic composite membrane may have a membrane median pore size of 0.3 μm or less, for example, after firing. In the embodiments described herein, the firing may comprise heating the coated cordierite monolith to a firing temperature of from about 900° C. to about 1300° C., or from about 1100° C. to about 1200° C. The firing may occur over a predetermined firing time such as from 0.5 hours to about 5 hours, for example. A firing may be conducted in any suitable heating vessel such as an oven or kiln, and may include any suitable heating profile such as, for example, a ramp rate of 0.5° C./min to 5° C./min, 0.5° C./min to 2° C./min, or 1° C./min to 2° C./min.

Optionally, the application of the cordierite-ceramic composite slip and firing of the coated cordierite monolith may be repeated until a desired thickness of the cordierite-ceramic composite membrane is achieved. In some embodiments, the coated cordierite monolith may be dried between the application of the cordierite-ceramic composite slip and the firing of the coated cordierite monolith. Such drying may include oven drying or spin-drying using centrifugal forces.

In some embodiments, the methods for forming the composite-membrane monolith may further comprise separately mixing a cordierite slip and a ceramic slip to form the cordierite-ceramic composite slip. The methods may still further comprise forming the cordierite slip, the ceramic slip, or both.

Mixing the cordierite slip and the ceramic slip to form the cordierite-ceramic composite slip may include pouring the two slips into a single container and stirring, for example by magnetic stirring, until a homogeneous mixture is obtained. The mixing may be followed by filtering, such as by pouring through a fine screen. The mixing may be followed by degassing, for example, using a vacuum pump. The cordierite slip used to form the cordierite-ceramic composite slip may comprise cordierite particles having cordierite median particle sizes according to embodiments described above. Likewise, the ceramic slip used to form the cordierite-ceramic composite slip may comprise ceramic particles having ceramic median particle sizes according to embodiments described above. The cordierite slip, the ceramic slip, or both may further comprise an aqueous or organic solvent as a carrier and additional ingredients such as binders, dispersants, and antifoaming agents, or combinations thereof. The additional ingredients in the cordierite slip and/or the ceramic slip may be as described above, in composition and amount in weight percent, with regard to the cordierite-ceramic composite slip. In some embodiments, mixing calculations may be facilitated if both the cordierite slip and the ceramic slip are prepared having the same weight percent of total solids, based on the weight of the cordierite or ceramic particles in the respective slip. Thereby, the weight percent of cordierite in the cordierite-ceramic composite slip will equal the weight of cordierite slip added to the cordierite-ceramic composite slip, divided by the total weight of the cordierite-ceramic composite slip.

Forming the cordierite slip may comprise first mixing the cordierite particles with a vehicle such as water or an organic solvent, a grinding medium, and at least one ingredient selected from the group consisting of binders, dispersants, and antifoaming agents to form a cordierite mixture. To avoid contamination issues, if water is used, preferably the water is distilled water or deionized water. Thereafter, the cordierite mixture may be milled until the cordierite particles therein have a median particle size less than the surface median pore size of the cordierite monolith to which the slip is to be applied. Milling the cordierite mixture may be accomplished by any method suitable for reducing particle sizes of cordierite materials. In illustrative embodiments, the milling may comprise wet milling or ball milling for an appropriate time such as from 4 hours to 24 hours. For example, cordierite particle size may be reduced from about 11.6 μm, as commercially available, to about 2.5 μm, by ball milling with alumina grinding media or yttria-stabilized zirconia grinding media, for about 4 hours. The same technique continued for about 24 hours may result in a size reduction of the 11.6 μm cordierite particles to about 1.0 μm.

Forming the ceramic slip may comprise mixing the ceramic particles with a vehicle such as water or an organic solvent, a binder, a dispersant, and an antifoaming agent to form the ceramic slip. The ceramic slip prepared in this manner may be dispersed by any known technique such as magnetic bar stirring or general ball-milling, for example.

Thus, as has been described through various aspects and embodiments of composite-membrane monoliths and methods for making the same, composite-membrane monoliths are contemplated that meet or exceed polymer coatability requirements because median pore sizes of the membrane surfaces are sufficiently small, particularly below 0.3 μm. The small median pore size of the membrane surfaces results from the formation of a cordierite-ceramic composite membrane from relatively large cordierite particles and relatively small ceramic particles. Particularly when characteristics such as coefficient of thermal expansion are closely matched between the cordierite-ceramic composite membrane and the cordierite monolith, the cordierite-ceramic composite membranes are essentially crack-free, thereby providing a suitable base to which a polymer coating may be applied. Moreover, the cordierite-ceramic composite membranes achieve the high coatability and small median pore size without the need to form or grow intermediate or intervening layers between the cordierite-ceramic composite membrane and the cordierite monolith. These and other aspects of the composite-membrane monoliths and methods thereof will become even more evident through the Examples provided below.

EXAMPLES

The embodiments described herein will be further clarified by the following examples.

Example 1

Preparation of 2.5 μm Cordierite-Alumina Composite Slips

This example describes preparation of two cordierite-alumina composite slips using different weight ratios of cordierite and alumina materials with average particle sizes of 2.5 μm. The cordierite was commercially available ground cordierite material initially having a median particle size ($d_{50}$) of 11.6 μm, and the alumina was A-16 with an initial $d_{50}$ of 0.2-0.3 μm. The ratio of cordierite to alumina in the first of the two slips was 7:3, and the ratio of cordierite to alumina in the second of the two slips was 3:7.

Figure 3:
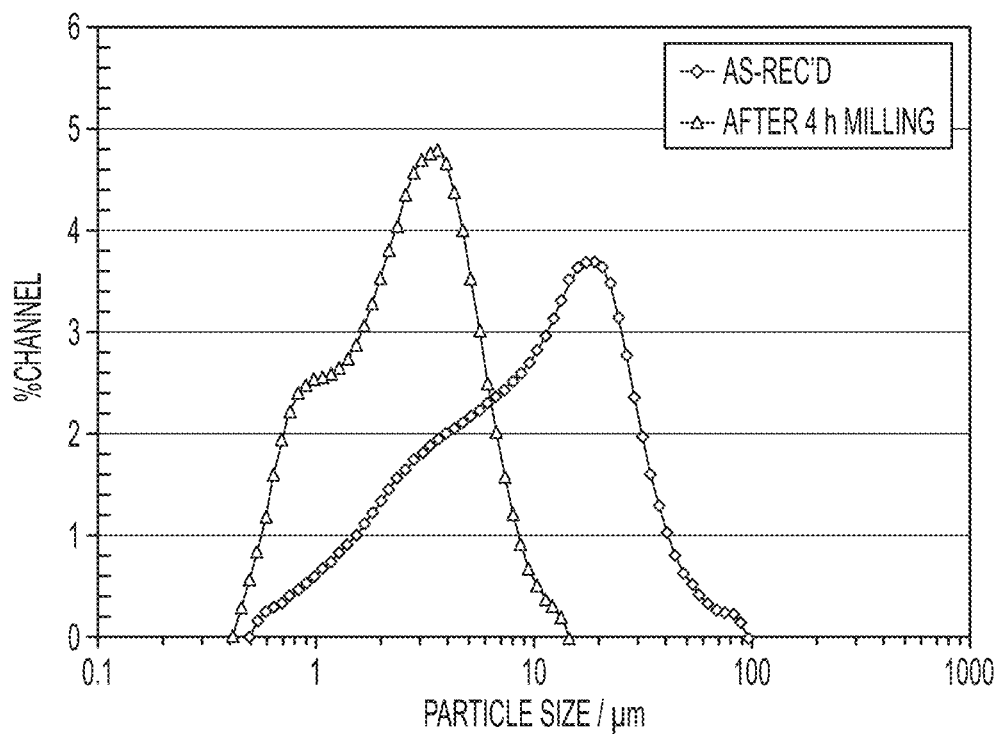
FIG. 3 graphically depicts a particle size distribution of the cordierite particles utilized in Example 1.

First, a water-based cordierite with 15% solids content and 4% polymer binder was prepared by adding 0.26 g of Tiron® (4,5-dihydroxy-1,3-benzenedisulfonic acid disodium salt, Fluka) and 237.5 g deionized (DI) water to a 1-L plastic jar, then adding 87.0 g of ground cordierite powder, 102.7 g of 20 wt. % polyethylene glycol (PEG, MW=20,000, Fluka), and 7.4 g of 1% DC-B anti-foam emulsion solution (Dow-Corning). The mixture was transferred to a 1.5 gallon (6.6 L) jar loaded with 12 lb (5.4 kg) of ⅜ inch (0.95 cm) yttria-stabilized zirconia media. After ball-milling at 61 rpm for 4 hours, the cordierite particle size was measured using a Microtrac particle analyzer. The particle size decreased from 11.6 μm to 2.5 μm, as shown in FIG. 3. The resultant cordierite slip is referred as to hereafter as the 2.5 μm cordierite slip.

A water-based alumina with 15% solid content and 4% polymer binder was then prepared. After 0.26 g Tiron® was dissolved in 237.5 g DI water, 87.0 g of A-16 alumina was added to the mixture, followed by 102.7 g of 20 wt. % PEG solution and 7.4 g of 1% DC-B antifoam emulsion solution. The resultant alumina slip was further stirred or ball-milled for 15 hours to 20 hours.

Two 600 g batches of 15% cordierite-alumina composite slips were prepared by mixing the alumina slip with the 2.5 μm cordierite slip. The first was a 70 wt. % cordierite 2.5 μm cordierite-alumina composite slip made from 420 g of the 2.5 μm cordierite slip and 180 g of the alumina slip. The second was a 30 wt. % cordierite 2.5 μm cordierite-alumina composite slip made from 180 g of the 2.5 μm cordierite slip and 420 g of the alumina slip. The composite slips were screened and vacuum dried in preparation for making the composite membranes.

Example 2

Preparation of 1.0 μm Cordierite-Alumina Composite Slips

This example describes preparation of two cordierite-alumina composite slips using different weight ratios of cordierite and alumina materials with average particle sizes of 1.0 μm. The cordierite used in this example was a fine cordierite material having an initial $d_{50}$ of about 2 μm, and the alumina was A-16 with an initial $d_{50}$ of 0.2-0.3 μm. The ratio of cordierite to alumina in the first of the two slips was 7:3, and the ratio of cordierite to alumina in the second of the two slips was 3:7.

Figure 4:
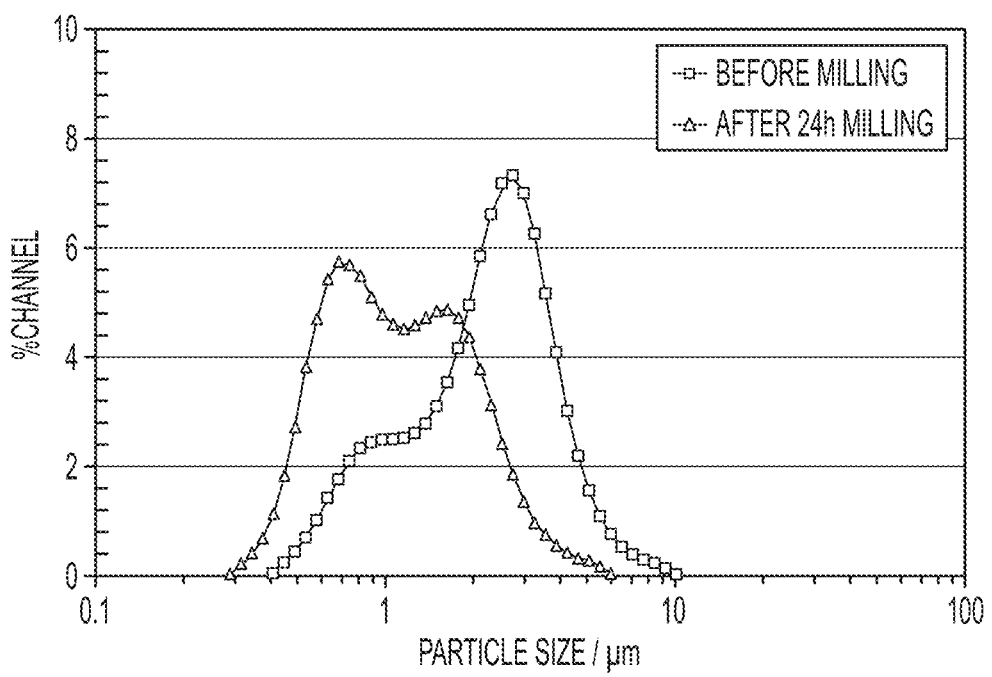
FIG. 4 graphically depicts a particle size distribution of the cordierite particles utilized in Example 2.

First, a water-based cordierite with 15% solids content and 4% polymer binder was prepared by adding 0.26 g Tiron® and 237.5 g DI water to a 1 L plastic jar, then adding 87.0 g of ground cordierite powder, and 102.7 g of 20 wt % PEG and 7.4 g 1% of DC-B anti-foam emulsion solution. The mixture was transferred to a 1.5 gallon (6.6 L) jar loaded with 12 lb (5.4 kg) of ⅜ inch (0.95 cm) yttria-stabilized zirconia media. After ball-milling at 61 rpm for 24 h, the cordierite particle size was measured using a Microtrac particle analyzer. As shown in FIG. 4, the particle size decreased from 2 μm to 1 μm. The resultant cordierite slip is referred to hereafter as the 1.0 μm cordierite slip.

A water-based alumina with 15% solid content and 4% polymer binder was then prepared. After 0.26 g Tiron® was dissolved in 237.5 g DI water, 87.0 g A-16 alumina was added into the mixture followed by 102.7 g 20 wt. % PEG solution and 7.4 g 1% DC-B anti-foam emulsion solution. The resulting alumina slip was further stirred or ball-milled for 15 to 20 hours.

Two 600 g batches of 15% cordierite-alumina composite slips were prepared by mixing the alumina slip with the 1.0 μm cordierite slip. The first batch was a 70 wt. % cordierite 1.0 μm cordierite-alumina slip composite made from 420 g of the 1.0 μm cordierite slip and 180 g of the alumina slip. The second batch was a 30 wt. % cordierite 1.0 lam cordierite-alumina composite slip made from 180 g of the 1.0 μm cordierite slip and 420 g of the alumina slip. The composite slips were screened and vacuum dried in preparation for making the composite membranes.

Example 3

Unsupported 2.5 μm Cordierite-Alumina Composite Membranes

This example describes preparation of two unsupported cordierite-alumina composite membranes, the first being a 70 wt. % cordierite 2.5 μm cordierite-alumina composite membrane, and the second being a 30 wt. % cordierite 2.5 μm cordierite-alumina composite membrane. The composite membranes were made by slip-coating on filter paper using the corresponding slips described in Example 1, followed by drying and firing.

The 70 wt. % cordierite 2.5 μm cordierite-alumina composite slip from Example 1 was poured into a porcelain Buchner funnel with a Grade 40 Whatman™ filter paper on the bottom. A thin cake layer was formed after water was removed from the slip under vacuum. The cake then was removed from the funnel along with the filter paper. After the filter paper was dried, the cake was peeled off from the filter paper and fired at 1150° C. for 2 hours. The resulting 70 wt. % cordierite 2.5 μm cordierite-alumina composite membrane was characterized by mercury porosimetry for pore size and pore size distribution. The 30 wt. % cordierite 2.5 µm cordierite-alumina composite membrane was prepared and characterized in the same manner.

Figure 5:
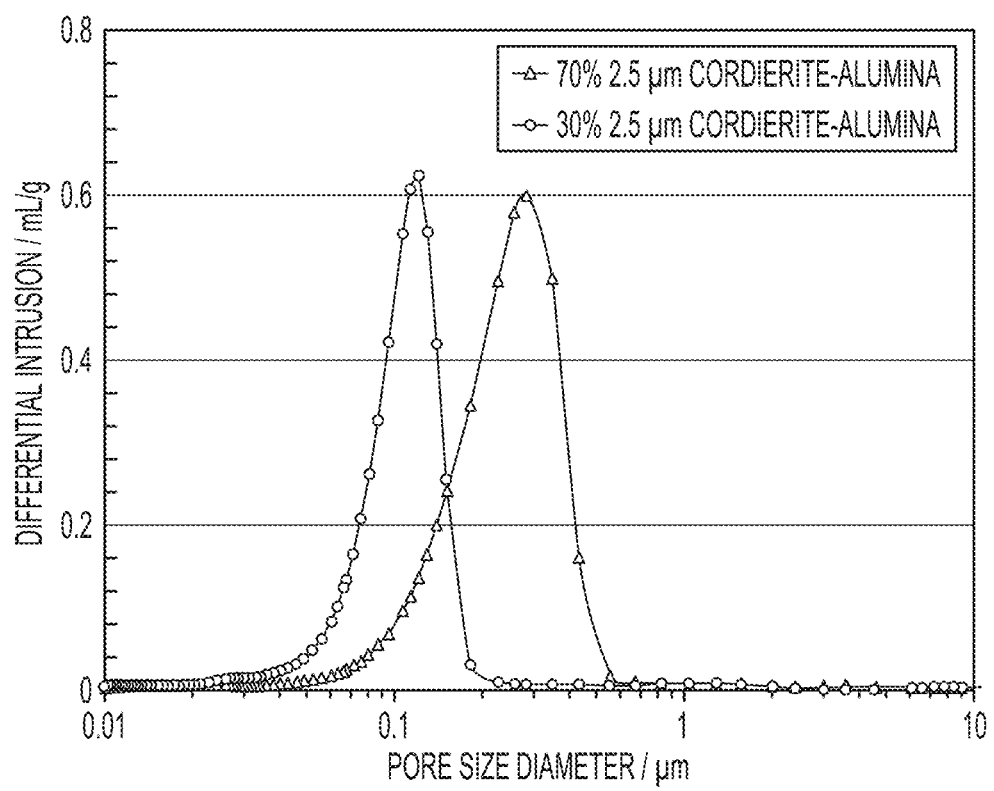
FIG. 5 graphically depicts the pore size distribution of the supported composite membrane of Example 3.

FIG. 5 shows the pore size and the pore size distribution for these two unsupported cordierite membranes. The mean pore size for the 70 wt. % cordierite 2.5 µm cordierite-alumina composite membrane was 0.27 µm, and the mean pore size for the 30 wt. % cordierite 2.5 µm cordierite-alumina composite membrane was 0.12 µm, both under a coatability target of less than 0.3 µm.

As a basis for comparison, an unsupported 2.5 µm cordierite-only membrane was prepared in the same manner, using the 2.5 µm cordierite slip. The pore size of the 2.5 µm cordierite-only membrane was found to be from 0.4 µm to 0.6 µm.

Example 4

Unsupported 1.0 µm Cordierite-Alumina Composite Membranes

This example describes the preparation of two additional unsupported cordierite-alumina composite membranes, the first being a 70 wt. % cordierite 1 µm cordierite-alumina composite membrane, and the second being a 30 wt. % cordierite 1 µm cordierite-alumina composite membrane. The composite membranes were prepared by slip-coating on filter paper using the corresponding slips from Example 2, followed by drying and firing.

Figure 6:
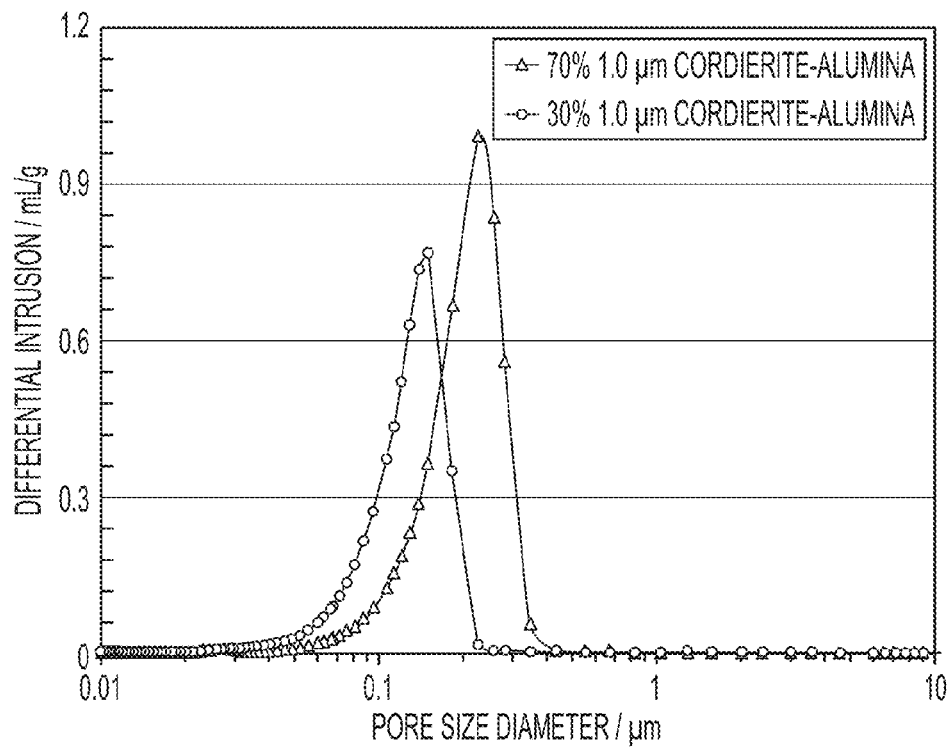
FIG. 6 graphically depicts the pore size distribution of the two unsupported composite membranes of Example 4.

FIG. 6 shows the pore size and the pore size distribution for these two unsupported cordierite membranes. Pore sizes for the 70 wt. % cordierite 1.0 µm cordierite-alumina composite membrane ranged from about 0.08 µm to about 0.35 µm, with a mean pore size of about 0.22 µm. Pore sizes for the 30 wt. % cordierite 1.0 µm cordierite-alumina composite membrane ranged from about 0.07 µm to about 0.22 µm, with a mean pore size of about 0.14 µm. The mean pore sizes of both composite membranes were under the coatability target of less than 0.3 µm.

As a basis for comparison, an unsupported 1.0 µm cordierite-only membrane was prepared in the same manner, using the 1.0 µm cordierite slip. The pore size of the 1.0 µm cordierite-only membrane was found to be 0.33 µm.

Example 5

Cordierite-Alumina Composite Membrane Deposited on Cordierite Monolith Substrate This example describes a cordierite-alumina composite membrane coated onto a monolith cordierite substrate. The monolith cordierite substrate used in this example was made of cordierite with an outer diameter of 1 inch (2.74 cm) and a length of 2 inches (5.48 cm) comprising 91 rounded channels of an average diameter of 1.8 mm being uniformly distributed over the cross-sectional area. The monolith substrate had a median pore size of 4.4 µm and a porosity of 46-47%, as measured by mercury porosimetry. The substrate was flushed through the channels with DI water and was fully dried at 120° C. in an oven overnight.

The 70 wt. % cordierite 2.5 µm cordierite-alumina composite slip from Example 1 was used in this example. The composite slip comprised a total solids content of 15%. The weight ratio of cordierite to alumina in the composite slip was 7:3. Before coating, the composite slip was screened and vacuumed.

The monolith substrate was mounted into the flow coater and the composite slip in the tank was introduced to the inner channels of the monolith substrate by a pressure difference. After the slip contacted the inner-channel surface of the monolith substrate wall for 20 seconds, it was released back to the tank. The coated monolith substrate was then unloaded and spun at 525 rpm for 1 min After being dried at 120° C. for 2 hours, the coated monolith substrate was coated again in the same manner using the same slip. The twice-coated monolith substrate was dried again at 120° C. for 2 hours and was fired using a heating rate of 1° C./min, a dwell time of 2 hours at 1150° C., and a cooling rate of −2° C./min.

Figure 7:
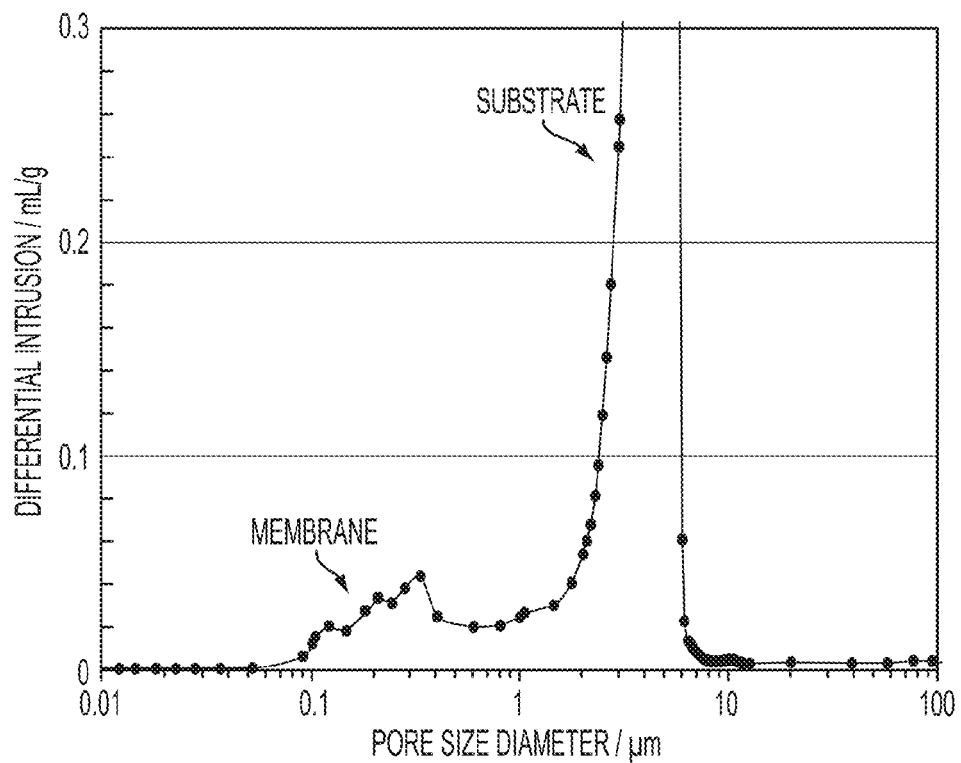
FIG. 7 graphically depicts the pore size distribution of the two unsupported composite membranes of Example 5.

FIGS. 1 and 2 show SEM images of the channel surface of the resultant membrane formed on the monolith. FIG. 7 shows the pore size and pore size distribution of the cordierite-ceramic composite membrane coated on the monolith. Characterization of the 70 wt. % cordierite 2.5 µm cordierite-alumina composite membrane by SEM showed that the composite membrane was free of cracks and had a membrane thickness of about 15 µm. Characterization of the same composite membrane by mercury porosimetry showed two peaks: one for the monolith substrate and one for the composite membrane. The peak representing the monolith substrate showed that the monolith substrate had a pore size of 4 µm, consistent with porosimetry data obtained from on a bare monolith substrate. The peak representing the 70 wt. % cordierite 2.5 µm cordierite-alumina composite membrane supported on the monolith substrate showed a broad pore-size distribution in the range of 0.05 µm to 0.4 µm, with a peak maximum at about 0.3 µm, consistent with data obtained from the unsupported 70 wt. % cordierite 2.5 µm cordierite-alumina composite membrane of Example 3.

Example 6

Membrane Coatability

This example describes the impact of mixing coarse cordierite particles with fine alumina particles, as illustrated through Examples 1-5, on the pore structure and coatability of a subsequent polymer coating. A cordierite-only membrane was made from the 2.5 µm cordierite slip on the same type of 1 inch by 2 inch (2.74 cm×5.48 cm) cordierite monolith substrate used in Example 5. The cordierite membrane was fired using a heating rate of 1° C./min, a dwell time of 2 hours at 1150° C., and a cooling rate of −2° C./min. A second cordierite-only membrane was prepared using the same procedure, except that the 1.8 µm cordierite slip was used in the place of the 2.5 µm cordierite slip.

Figure 8:
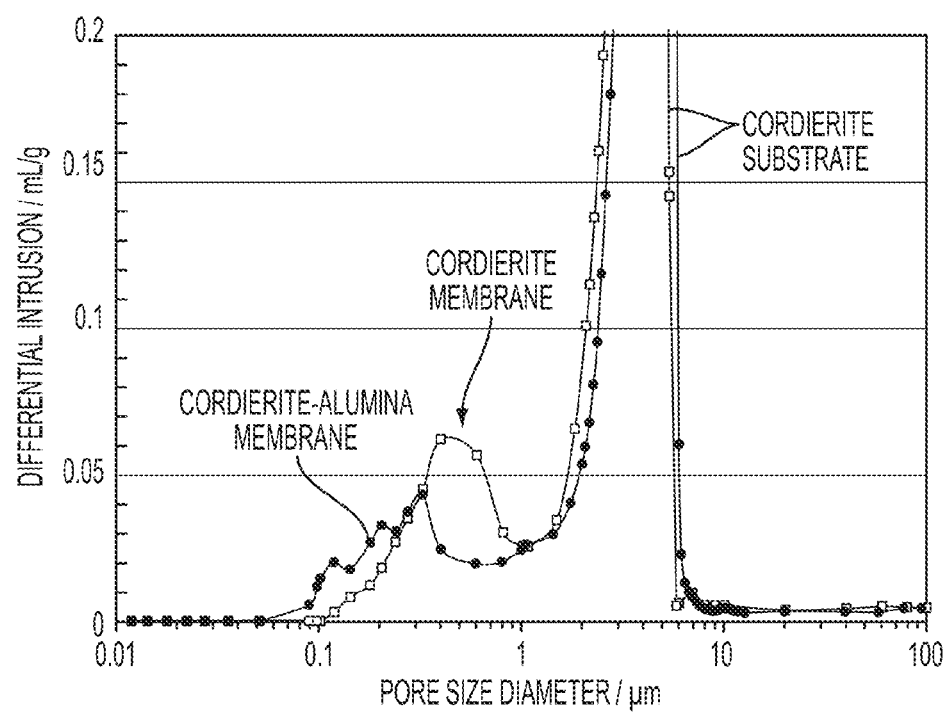
FIG. 8 is a graphical comparison of the pore size distribution of an inventive cordierite-ceramic composite membrane and a comparative cordierite membrane.

As shown in FIG. 8, the pore-size distribution of the resulting 2.5 µm cordierite-only membrane supported on the monolith substrate was compared with that of the 70 wt. % cordierite 2.5 µm cordierite-alumina composite membrane prepared in Example 5. The cordierite-only membrane had a broad pore-size distribution from 0.1 µm to 1.0 µm with a peak around 0.4 µm to 0.5 µm, compared to that of the cordierite-alumina composite membrane, which had a pore-size distribution of from 0.05 µm to 0.4 µm with a peak at about 0.3 µm. Thus, it is believed that the addition of fine alumina particles to the cordierite membrane resulted in substantial elimination of pores in the size range of 0.4 µm to 1.0 µm, with addition of smaller pores in the size range of 0.05 µm to 0.1 µm. The smaller pores are believed to establish higher coatability with regard to subsequently applied polymer coatings.

The coatability of the cordierite-alumina composite membrane of Example 5 was evaluated by subsequent polymer coating and was compared with the coatability of the two cordierite-only membranes prepared in the present Example as controls. TABLE 1 compares coatability of the two cordierite membranes with that of the cordierite-alumina composite membrane. Polymer coating was accomplished by applying a dilute emulsion coating and a slip coating, followed by vacuum tight test. A total of three dilute emulsion coatings and nine slip coatings were applied on the two cordierite-only membranes, but they were still not vacuum tight, indicating of poor coatability. In contrast, the cordierite-alumina composite membrane achieved vacuum tightness after application of only one dilute emulsion coating and 5 to 7 slip coatings.

TABLE 1

Coatability Comparisons for Polymer Coatings on Deposited Membranes

| Membrane on Monolith Substrate | Number of Dilute Emulsion Coatings | Number of Slip Coatings | Vacuum Tight? |
|---|---|---|---|
| 70 wt. % cordierite 2.5 μm cordierite-alumina composite membrane of Example 5 (Inventive) | 1 | 5-7 | Yes |
| 2.5 μm cordierite-only (Comparative) | 3 | 9 | No |
| 1.8 μm cordierite-only (Comparative) | 3 | 9 | No |

In a first aspect, the disclosure provides composite-membrane monoliths. The composite-membrane monoliths may include a cordierite monolith having surfaces with a surface median pore size of from about 1 μm to about 15 μm. The composite-membrane monoliths also may include a cordierite-ceramic composite membrane bonded to the surfaces. The cordierite-ceramic composite membrane may define membrane surfaces of the cordierite-ceramic composite membrane. The cordierite-ceramic composite membrane may be a composite formed from a mixture including, for example, cordierite particles and ceramic particles. The cordierite particles may have a cordierite median particle size smaller than the surface median pore size of the ceramic monolith. The ceramic particles may have a ceramic median particle size smaller than the cordierite median particle size. The combination of the respective median particle sizes of the cordierite particles and the ceramic particles may result in membrane surfaces having a membrane median pore size of 0.3 μm or less.

In a second aspect, the disclosure provides composite-membrane monoliths of the first aspect, in which the cordierite median particle size is from about 0.8 μm to about 5 μm.

In a third aspect, the disclosure provides composite-membrane monoliths of the first or second aspect, in which the ceramic median particle size is from about 0.05 μm to about 0.5 μm.

In a fourth aspect, the disclosure provides composite-membrane monoliths of any one of the first through third aspects, in which the ceramic particles are a ceramic material selected from the group consisting of alumina, ceria, silica, zirconia, zeolite, mullite, titania, yttria, tin oxide, silicon carbide, silicon nitride, and mixtures thereof.

In a fifth aspect, the disclosure provides composite-membrane monoliths of any one of the first through third aspects, in which the ceramic particles are alumina particles.

In a sixth aspect, the disclosure provides composite-membrane monoliths of any one of the first through fifth aspects, in which the ceramic median particle size is from about 0.05 μm to about 0.5 μm.

In a seventh aspect, the disclosure provides composite-membrane monoliths of any one of the first through fifth aspects, in which the ceramic median particle size is from about 0.2 μm to about 0.3 μm.

In an eighth aspect, the disclosure provides composite-membrane monoliths of any one of the first through seventh aspects, in which the weight ratio of the cordierite particles to the ceramic particles in the mixture is from 9:1 to 3:7.

In a ninth aspect, the disclosure provides composite-membrane monoliths of any one of the first through seventh aspects, in which the weight ratio of the cordierite particles to the ceramic particles in the mixture is from 7:3 to 3:7.

In a tenth aspect, the disclosure provides composite-membrane monoliths of any one of the first through ninth aspects, in which the membrane surfaces are crack-free.

In an eleventh aspect, the disclosure provides a method for forming a composite-membrane monolith, the method comprising: applying a cordierite-ceramic composite slip to surfaces of a cordierite monolith, the cordierite-ceramic composite slip comprising cordierite particles and ceramic particles other than cordierite particles to form a coated cordierite monolith, the surfaces of the monolith having a surface median pore size of from about 1 μm to about 15 μm, the cordierite particles having a cordierite median particle size smaller than the surface median pore size, the ceramic particles having a ceramic median particle size smaller than the cordierite median particle size; and firing the coated cordierite monolith to form the composite-membrane monolith, the cordierite-ceramic composite slip forming, during the firing, a cordierite-ceramic composite membrane bonded to the surfaces of the cordierite monolith and having a membrane surface with a membrane median pore size of 0.3 μm or less.

In a twelfth aspect, the disclosure provides a method according to the eleventh aspect, in which the cordierite-ceramic composite slip comprises from 30 wt. % to 90 wt. % cordierite particles and from 10 wt. % to 70 wt. % ceramic particles, based on the combined weight of the cordierite particles and the ceramic particles.

In a thirteenth aspect, the disclosure provides a method according to the eleventh or twelfth aspect, in which the cordierite median particle size is from is from about 0.8 μm to about 5 μm and the ceramic median particle size is from about 0.05 μm to about 0.5 μm.

In a fourteenth aspect, the disclosure provides a method according to any one of the eleventh through thirteenth aspects, in which the membrane surface is crack-free.

In a fifteenth aspect, the disclosure provides a method according to any one of the eleventh through fourteenth aspects, in which the ceramic particles are a ceramic material selected from the group consisting of alumina, ceria, silica, zirconia, zeolite, mullite, titania, yttria, tin oxide, silicon carbide, silicon nitride, and mixtures thereof.

In a sixteenth aspect, the disclosure provides a method according to any one of the eleventh through fourteenth aspects, in which the ceramic particles are alumina particles.

In a seventeenth aspect, the disclosure provides a method according to any one of the eleventh through sixteenth aspects, in which the firing comprises heating the coated cordierite monolith to a firing temperature of from about 900° C. to about 1300° C.

In an eighteenth aspect, the disclosure provides a method according to any one of the eleventh through seventeenth aspects, in which the cordierite-ceramic composite slip further comprises an additional ingredient selected from the group consisting of binders, dispersants, and combinations thereof.

In a nineteenth aspect, the disclosure provides a method according to any one of the eleventh through eighteenth aspects, in which the method further comprises mixing a cordierite slip and a ceramic slip to form the cordierite-ceramic composite slip.

In a twentieth aspect, the disclosure provides a method according to the nineteenth aspect, in which the method further comprises: mixing the cordierite particles with a vehicle, a grinding medium, and at least one ingredient selected from the group consisting of binders, dispersants, and antifoaming agents to form a cordierite mixture; and milling the cordierite mixture until the cordierite particles therein have a median particle size less than the surface median pore size of the cordierite monolith, to form the cordierite slip.

In a twenty-first aspect, the disclosure provides a method according to the nineteenth or the twentieth aspect, in which the method further comprises: mixing the ceramic particles with a vehicle, a binder, and a dispersant to form the ceramic slip.

In a twenty-second aspect, the disclosure provides a method according to any one of the nineteenth through twenty-first aspects, in which the cordierite slip, the ceramic slip, and the cordierite-ceramic composite slip each have solids contents of from about 5 wt. % to about 30 wt. %, based on the combined weight of the cordierite particles and the ceramic particles present in the respective slip.

In a twenty-third aspect, the disclosure provides a method according to any one of the eleventh through twenty-second aspects, in which the method further comprises repeating the application of the cordierite-ceramic composite slip and the firing of the coated cordierite monolith until a desired thickness of the cordierite-ceramic composite membrane is achieved.

In a twenty-fourth aspect, the disclosure provides a method according to any one of the eleventh through twenty-third aspects, in which the method further comprises drying the coated cordierite monolith between the application of the cordierite-ceramic composite slip and the firing of the coated cordierite monolith.

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A composite-membrane monolith comprising:
   a cordierite monolith having surfaces with a surface median pore size of from about 1 μm to about 15 μm; and
   a cordierite-ceramic composite membrane bonded directly to surfaces of the cordierite monolith without any intervening layer between the cordierite monolith and the cordierite-ceramic composite, the cordierite-ceramic composite having membrane surfaces with a membrane median pore size of 0.3 μm or less and with small pores having small-pore sizes from 0.05 μm to 0.1 μm, the membrane median pore size and the small pores providing polymer coatability to the membrane surfaces,
   wherein:
   the cordierite-ceramic composite membrane is a composite having a thermal coefficient of expansion approximately equal to the thermal coefficient of expansion of the cordierite monolith and is formed from a cordierite-ceramic composite slip comprising:
   from 30 wt. % to 90 wt. % cordierite particles having a cordierite median particle size from about 1 μm to about 3 μm and smaller than the surface median pore size; and
   from 10 wt. % to 70 wt. % ceramic particles other than cordierite particles, the ceramic particles having a ceramic median particle size from about 0.05 μm to about 0.5 μm and smaller than the cordierite median particle size,
   wherein a weight ratio of the cordierite particles to the ceramic particles in the cordierite-ceramic composite slip is from 9:1 to 3:7.

2. The composite-membrane monolith of claim 1, wherein the ceramic particles are a ceramic material selected from the group consisting of alumina, ceria, silica, zirconia, zeolite, mullite, titania, yttria, tin oxide, silicon carbide, silicon nitride, and mixtures thereof.

3. The composite-membrane monolith of claim 1, wherein the ceramic particles are alumina particles.

4. The composite-membrane monolith of claim 3, wherein the ceramic median particle size is from about 0.2 μm to about 0.3 μm.

5. The composite-membrane monolith of claim 1, wherein the weight ratio of the cordierite particles to the ceramic particles in the mixture is from 9:1 to 3:7.

6. The composite-membrane monolith of claim 1, wherein the membrane surfaces are crack-free.

7. A method for forming a composite-membrane monolith, the method comprising:
   applying a cordierite-ceramic composite slip to surfaces of a cordierite monolith, the cordierite-ceramic composite slip comprising from 30 wt. % to 90 wt. % cordierite particles and from 10 wt. % to 70 wt. % ceramic particles other than cordierite particles to form a coated cordierite monolith, the surfaces of the monolith having a surface median pore size of from about 1 μm to about 15 μm, the cordierite particles having a cordierite median particle size from about 1 μm to about 3 μm and smaller than the surface median pore size, the ceramic particles having a ceramic median particle size from about 0.05 μm to about 0.5 μm and smaller than the cordierite median particle size, the weight ratio of the cordierite particles to the ceramic particles in the cordierite-ceramic composite slip being from 9:1 to 3:7; and
   firing the coated cordierite monolith to form the composite-membrane monolith, the cordierite-ceramic composite slip forming, during the firing, a cordierite-ceramic composite membrane as a composite having a thermal coefficient of expansion approximately equal to the thermal coefficient of expansion of the cordierite monolith and bonded directly to the surfaces of the cordierite monolith without any intervening layer between the cordierite monolith and the cordierite-ceramic composite, the cordierite-ceramic membrane having membrane surfaces with a membrane median pore size of 0.3 μm or less and with small pores having small-pore sizes from 0.05 μm to 0.1 μm, the membrane median pore size and the small pores providing polymer coatability to the membrane surfaces.

8. The method of claim 7, wherein the membrane surface is crack-free.

9. The method of claim 7, wherein the ceramic particles are a ceramic material selected from the group consisting of alumina, ceria, silica, zirconia, zeolite, mullite, titania, yttria, tin oxide, silicon carbide, silicon nitride, and mixtures thereof.

10. The method of claim 7, wherein the ceramic particles are alumina particles.

11. The method of claim 7, wherein the firing comprises heating the coated cordierite monolith to a firing temperature of from about 900° C. to about 1300° C.

12. The method of claim 7, wherein the cordierite-ceramic composite slip further comprises an additional ingredient selected from the group consisting of binders, dispersants, and combinations thereof.

13. The method of claim 7, further comprising mixing a cordierite slip and a ceramic slip in appropriate proportions to form the cordierite-ceramic composite slip in which the weight ratio of the cordierite particles to the ceramic particles in the cordierite-ceramic composite slip is from 9:1 to 3:7.

14. The method of claim 13, further comprising:
   mixing the cordierite particles with a vehicle, a grinding medium, and at least one ingredient selected from the group consisting of binders, dispersants, and antifoaming agents to form a cordierite mixture; and
   milling the cordierite mixture until the cordierite particles therein have a median particle size from about 1 μm to about 3 μm and less than the surface median pore size of the cordierite monolith, to form the cordierite slip.

15. The method of claim 13, further comprising:
   mixing the ceramic particles with a vehicle, a binder, and a dispersant to form the ceramic slip.

16. The method of claim 13, wherein the cordierite slip, the ceramic slip, and the cordierite-ceramic composite slip each have solids contents of from about 5 wt. % to about 30 wt. %, based on the combined weight of the cordierite particles and the ceramic particles present in the respective slip.

* * * * *